United States Patent
Laing

[15] 3,650,364
[45] Mar. 21, 1972

[54] FRICTION COUPLING WITH DUAL PISTONS

[72] Inventor: James Morrison Laing, Letchworth, England

[73] Assignee: Borg-Warner Limited, Letchworth, England

[22] Filed: July 15, 1970

[21] Appl. No.: 54,968

[30] Foreign Application Priority Data

July 18, 1969 Great Britain..................36,417/69

[52] U.S. Cl......................192/85 AA, 192/109 F, 188/72.4, 188/347, 91/411 A, 92/151
[51] Int. Cl.................................................F16d 25/06
[58] Field of Search................192/109 F, 85, 85 AA, 87.11, 192/87.17; 91/411 A; 92/151, 152; 188/347, 348, 72.4

[56] References Cited

UNITED STATES PATENTS

| | | |
|---|---|---|
| 3,230,792 | 1/1966 | Kelley et al.....................192/109 F X |
| 2,868,341 | 1/1959 | Snoy..............................192/109 F X |
| 2,901,888 | 9/1959 | Swift...................................92/151 X |

Primary Examiner—Benjamin W. Wyche
Attorney—Robert L. Zeig

[57] ABSTRACT

A clutch or brake actuating assembly, e.g., for use in a vehicle automobile transmission to engage a friction device in which first and second pistons are axially slidable in a cylinder. A reaction member is mounted by axially sliding it into place between the two pistons and is provided with a small orifice. Hydraulic fluid enters through a port between the first piston and the member, to move the first piston and begin engagement of the friction device, and subsequently bleeds through the orifice to act on the second piston to increase the engaging force.

5 Claims, 1 Drawing Figure

Patented March 21, 1972 3,650,364
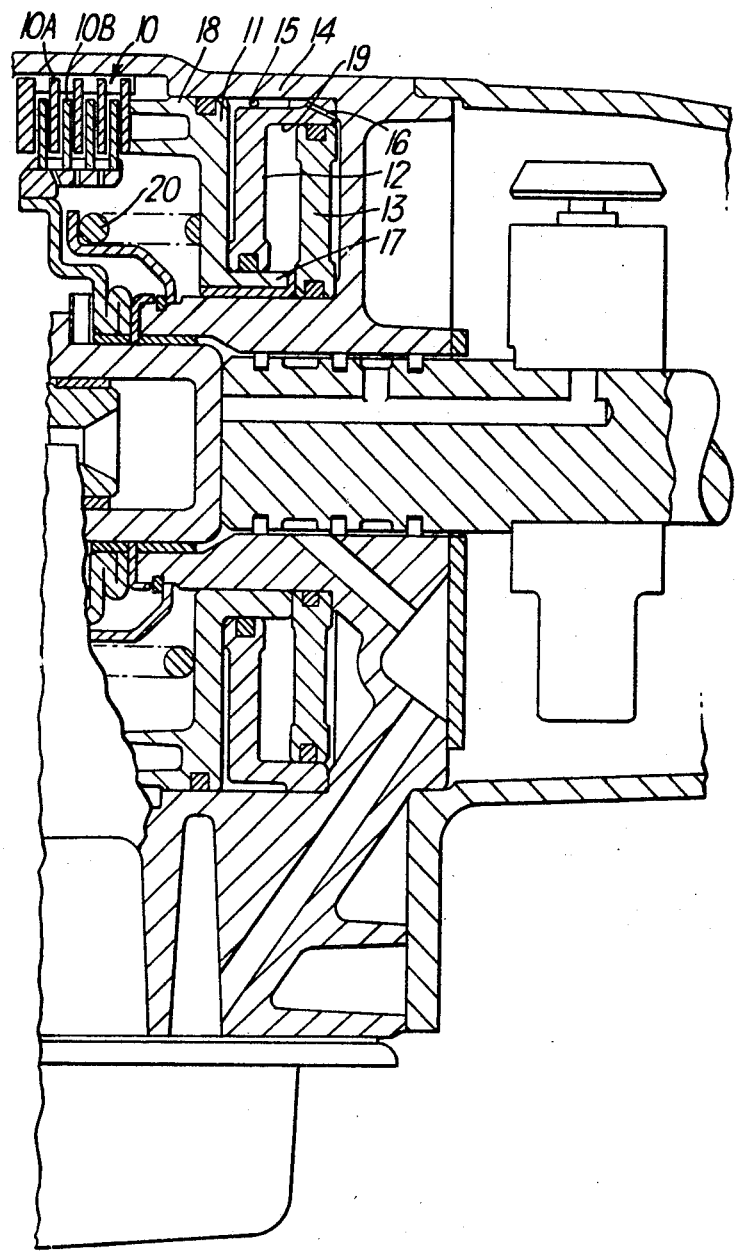
Inventor
JAMES MORRISON LAING
By Robert L. Zieg
Attorney

FRICTION COUPLING WITH DUAL PISTONS

The present invention relates to brake and clutch actuator assemblies. In certain brake and clutch actuator assemblies, such as are used in automatic transmissions, the driven friction elements and the drive friction elements are engaged by means of a hydraulically operated piston.

According to the present invention there is provided a clutch or brake actuating assembly for use with an engageable friction device comprising a hydraulic cylinder, first and second pistons mounted within said hydraulic cylinder and axially slidable therein to engage said friction device, a member axially slidable in said cylinder axially between said pistons, an orifice in said member, and means for supplying fluid between said first piston and said member.

With the construction of the present invention, the hydraulic fluid is introduced between the first piston and the member and moves the first piston to engage the friction elements with a light pressure. At the same time, hydraulic fluid flows through the small orifice in the member, so that after a short delay, the hydraulic fluid is also applied to the second piston. Thus, the effective area of the pistons of the assembly is doubled and in this way the brake is first of all applied with light force, and is subsequently applied with substantially double the initial force. This ensures that there is a smooth operation of the brake or clutch, so that if the brake or clutch is used in automatic transmission, there is a smooth gear change. Furthermore, the assembly is extremely easy to manufacture since the first piston, the member and the second piston can be assembled in position simply by sliding them in turn into the cylinder.

In a preferred construction, the first piston, the member and the second piston are all formed as annular members.

In order that the invention may more readily be understood the following description is given, merely by way of example, reference being made to the accompanying drawing, in which the sole FIGURE illustrates the output end of one embodiment of automatic transmission incorporating an assembly of the present invention.

In the drawing, a brake 10 is used to effect a gear change by means of stopping the ring gear of an epicyclic gear train (not shown). The brake includes two sets of friction elements 10A and 10B, the friction elements 10A being secured to the housing of the transmission, and the friction elements 10B being associated with the ring gear of the transmission. Thus, the friction elements 10B may be considered as drive elements, and the friction elements 10A as driven elements, although in this instance, the driven elements are not driven, but tend to brake the drive elements when the brake is applied.

Adjacent the friction elements 10A and 10B is mounted a first piston 11, which is axially slidable in a hydraulic cylinder 14. The piston 11 is urged to the right by a spring 20. At its left hand end, as viewed in the Figure, the piston 11 is provided with an axially extending portion 18, which engages the friction elements 10A, 10B. Immediately to the right of the first piston 11 is a member 12 which is slidably fitted in the cylinder 14.

On the side of the member 12 remote from the first piston 11 is a second piston 13. The first piston 11, the member 12 and the second piston 13 are all of annular configuration, and an axially extending wall 17 of piston 11 at the right hand side of the inner periphery thereof abuts the second piston 13. A hydraulic fluid supply port 15 is located between the annular first piston 11, and the annular member 12. Passing through an axial extension 19 of the member 12 is an orifice 16, which communicates with the right hand side of the second piston 13.

In operation of the brake assembly described, hydraulic fluid is introduced, when the particular gear change is required, through the supply port 15. Initially the piston 11 is force to the left by the pressure of the hydraulic fluid. The effect of this is to apply the brake with a light force. At the same time, hydraulic fluid flows through the orifice 16 in the member 12 slowly filling the area on the right hand side of piston 13 to cause the same to be moved to the left, thus engaging the brake more firmly.

Thus, the effective area of the piston is doubled. In this way the brake is first of all applied with a predetermined engaging force, and subsequently is applied with substantially double the force. This ensures that there is smooth engagement of the gear which is caused to operate by the brake being applied. In the first stage of operation, the hydraulic fluid acts both on the piston 11 and the member 12. The member 12 is prevented from moving to the right in the Figure by the axial extension abutting the end wall of the cylinder 14. Thus the member 12 acts as a reaction member for the hydraulic fluid in the first stage. The assembly is extremely easy to manufacture since the piston 13, member 12 and piston 11 can be assembled in position simply by sliding them in turn into the cylinder 14.

I claim:

1. An actuating assembly for use with an engageable friction device comprising, in combination:
   a hydraulic cylinder;
   first and second pistons mounted within said cylinder and axially slidable therein effective to engage said friction device;
   a member axially slidable mounted in said cylinder axially between said first and second pistons;
   means defining an orifice in said member;
   means for supplying fluid between said first piston and said member; and wherein said friction device is initially engaged with the force of said fluid supplied acting on said first piston and is subsequently engaged with additional force by said fluid admitted through said orifice acting on said second piston.

2. An assembly according to claim 1, wherein said first piston, said member and said second piston are annular members.

3. An assembly according to claim 2, and further comprising an axially extending member on said first piston engaged by said second piston.

4. An assembly according to claim 3, wherein said axially extending member is at the radially inner edge of said annular first piston.

5. An assembly according to claim 2, and further comprising an axially extending portion and wherein said orifice is located in said axially extending portion and said second piston is axially slidable within said axially extending portion.

* * * * *